Jan. 19, 1943.  W. McK. WHITE  2,308,733
BITUMEN HEATING KETTLE
Filed Sept. 6, 1938
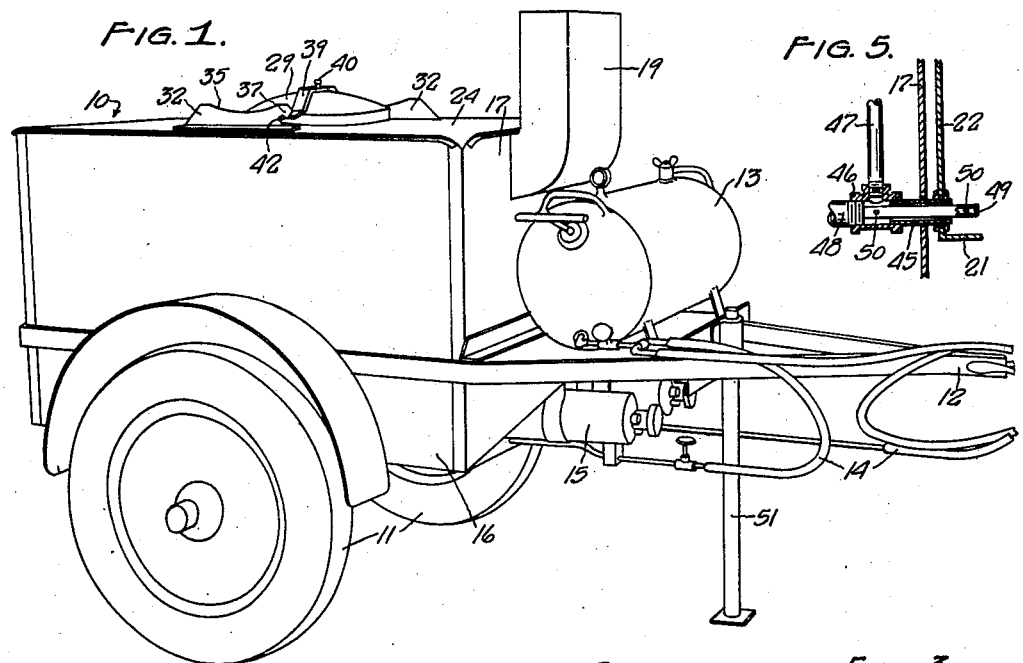
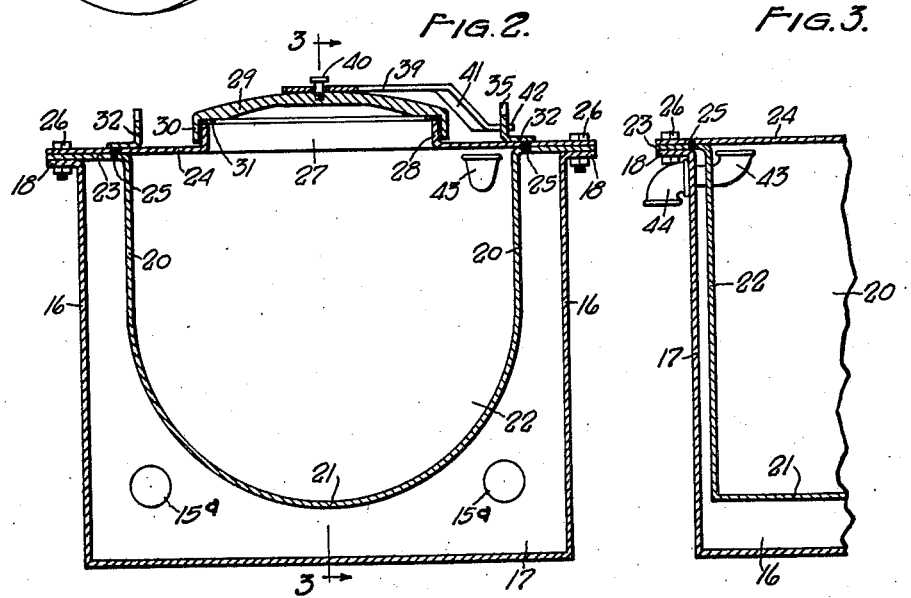
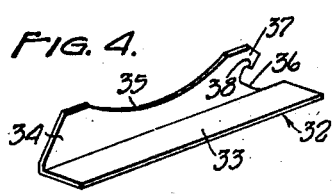
INVENTOR.
WILLIAM McKEAN WHITE.
BY Altach & Knoblock
ATTORNEYS.

Patented Jan. 19, 1943

2,308,733

UNITED STATES PATENT OFFICE 2,308,733

BITUMEN HEATING KETTLE

William McKean White, Elkhart, Ind.

Application September 6, 1938, Serial No. 228,594

5 Claims. (Cl. 126—343.5)

This invention relates to bitumen heating kettles, and particularly to a kettle in which bitumens containing a comparatively high proportion of volatile constituents may be heated out-of-doors preparatory to use. One example of such bitumens is asphalt used for road repair and maintenance wherein the high proportion of volatile constituents, with resultant slow-setting characteristics, is necessary to permit working, as rolling, etc., after heating and application. Adverse weather conditions, such as cold weather which hastens setting of exposed thermoplastic material of this type, is one of the conditions which especially necessitates slow-setting material for road work.

The high proportion of volatile constituents in such material results in a low flash point, and thus involves considerable danger to workmen when the material is heated preparatory to application. Furthermore, the characteristics of the material virtually require heating on the job, in mobile equipment, which presents difficulties in the matter of providing adequate safety precautions. At the present time, to the best of my knowledge, mobile heating kettles of this type are generally provided with simple hinged tops which may be swung upwardly to completely open the top of the kettle and which are held closed mainly by gravity. In such devices the tops are generally quite large to facilitate filling, etc., and hence are subject to buckling or distortion by the application of heat to melt the bitumen. Hence the tops quickly lose their effectiveness as a seal for the kettle and permit entrance of rain and snow into the kettle with serious results. Also, the kettles generally provide no escape for the volatile constituents which are expelled from the bitumen in heating, except at the hinged top. Still another limitation of conventional kettles is the use of a screen filter at the mouth of the draw-off conduit, which screen is inaccessible for cleaning while the kettle contains any material, and which is accessible for cleaning or replacement only at the interior of the kettle.

It is, therefore, the primary object of this invention to provide a kettle wherein bitumens having a high proportion of volatile constituents may be safely heated out-of-doors.

A further object is to provide a kettle which may be effectively sealed to render the same weather-tight.

A further object is to provide a kettle having a top permanently mounted thereon in sealed relation and provided with an opening normally sealed by a closure having locking means releasably engaging latch means carried by the top.

A further object is to provide a kettle of this character having a cover permanently secured thereon and provided with an opening and opposed latch members, wherein said latch members constitute supports for a container whose contents are to be transferred to the kettle.

A further object is to provide a kettle of this character which is normally sealed at its top and is provided with a novel vent for gaseous material so constructed that rain or snow cannot enter the kettle therethrough.

A further object is to provide a kettle of this character with a filtering member at its draw-off conduit adapted for removal from the exterior of the kettle.

Other objects will be apparent from the description and appended claims.

In the drawing:

Fig. 1 is a perspective view of one type of mobile kettle.

Fig. 2 is a transverse vertical sectional view illustrating the kettle construction in detail.

Fig. 3 is a fragmentary longitudinal vertical sectional view taken on line 3—3 of Fig. 2.

Fig. 4 is an enlarged perspective view of a latch member.

Fig. 5 is a vertical sectional detail view of the filtering draw-off construction.

Referring to the drawing, which illustrates one embodiment of the invention, the numeral 10 designates the kettle assembly which is mounted on wheels 11 to be drawn by tongue 12. A tank 13 for oil supplied by conduits 14 to oil burner 15, all suitably mounted on the mobile assembly adjacent the kettle 10, constitute the means for heating the kettle. The burners 15 are received in openings 15a shown in Figure 2.

Kettle assembly 10 constitutes an exterior frame comprising vertical side walls 16 and end walls 17, which are secured together to constitute a rigid frame unit. The bottom of the frame unit is closed, and the upper ends of walls 16 and 17 are provided with outwardly bent flanges 18, all as illustrated in Fig. 2. A stack 19 communicates with an opening in front wall 17 of the kettle frame for exhaust of the products of combustion from oil burners 15.

The kettle proper comprises a U-shaped sheet of metal forming side walls 20 and a curved bottom 21, and end walls 22 secured thereto. Each of the walls 20 and 22 is provided with an outwardly bent horizontal flange 23 at its upper end. A cover 24 fits over the kettle and is welded to the flanges 23 as at 25, around its perimeter, whereby it is permanently secured on the kettle proper in sealed relation. The dimensions of cover 24, and the extension of flanges 23, are preferably such that they both overlie flanges 18 of the kettle frame and may be secured thereto by bolts 26, whereby the kettle is suspended from the top of the frame. The kettle walls 20 and 22 are spaced from the frame walls 16 and 17 to form a heat chamber encircling the kettle proper and permitting circulation thereabout of the products of combustion passing to stack 19 from burners 15.

Cover 24 is provided with a central opening or manhole 27 defined by an annular flange 28. A closure 29, preferably provided with a marginal flange 30 fitting around flange 28, and with a sealing gasket 31, fits on closure flange 28.

A pair of latch members 32 are mounted on cover 24 on opposite sides of manhole 27, and spaced therefrom. As best illustrated in Fig. 4, the latch members preferably comprise a sheet of metal longitudinally bent at an angle to provide a base flange 33 welded or otherwise secured to cover 24, and a vertical part 34. The part 34 is provided with a concave curved upper edge 35, and one end thereof is configured to provide an inset portion 36 adjacent its lower portion and a projecting latch portion 37 thereabove which is provided with an outwardly and downwardly inclined locking edge or shoulder 38.

A bar 39 is pivoted to closure 29 by pin 40 at its center, and its ends are downwardly bent at 41 and terminate in outwardly projecting pins 42 adapted to seat under edges 38 of projections 37 of latch members 32 to lock the closure 29 in sealing relation over the manhole 27. For this purpose, the bars 39 are somewhat resilient, and the locking projections 37 of the opposite latch members 32 are oppositely positioned, i. e., one at the front end and the other at the rear end thereof.

A vent is provided at one end of the kettle, preferably the rear end, and comprises a reversely bent passage. The vent construction is best illustrated in Fig. 3, and comprises an interior L-shaped fitting or elbow 43 extending through kettle wall 22 and frame wall 17, with its inner end extending upwardly in closely spaced parallel relation to cover 24. An elbow 44 is secured to the outer end of elbow 43 exteriorly of frame wall 17 and with its open end turned downwardly.

The draw-off arrangement, preferably located adjacent the lower end of the kettle at the rear thereof, is best illustrated in Fig. 5. The construction comprises a pipe 45 having a sealed fitting with kettle wall 22 and passing through frame wall 17 for connection with a T-fitting 46. A pipe 47 is connected to fitting 46 and extends perpendicularly to pipe 45 for communication with a pump (not shown). A fitting 48, as a part of a conventional control gate (not shown) is threaded in the outer end of fitting 46 and includes a communicating tubular member 49 of a size to fit snugly and still slide freely in pipe 45. The inner end of member 49 is closed and a plurality of small apertures 50 are formed in member 49 to communicate with the interior of the kettle and with the interior of fitting 46. Apertured member 49 constitutes a filtering draw-off.

In use of the device, the kettle is supported in horizontal position by a movable supporting member 51 at its front. While so positioned, and with closure 29 removed, the kettle may be readily filled by supporting a barrel (not shown) on the curved upper edges 35 of latch members 32, whereby the contents may drain into the kettle through the manhole opening, the parts being so proportioned that the barrel clears the manhole collar 28. The closure 29 is then applied, being locked in place by seating the ends 42 of bar 39 under the projections 37 of latch members 32. A positive sealed lock is thus provided for the closure, and the kettle is effectively weather-sealed. At the same time, as the volatile constituents of the bitumen are thrown off during the heating process, the same are permitted to exhaust at vent 43—44, thereby preventing the building up of dangerous gas pressure within the kettle. The downwardly turned outer part 44 of the vent prevents entry of snow or rain into the kettle therethrough, so that the kettle effectively excludes all precipitation and hence avoids the danger connected therewith in out-of-door apparatus of this character. It will further be noted that except for the gas vent, air is substantially excluded from the kettle, so that fire danger normally present by reason of the low flash point of the bitumen is minimized, particularly when the interior pressure resulting from emission of gases from the heated bitumen can escape only through the restricted vent outlet.

The construction of the filtering draw-off arrangement permits removal of the filter element by simply releasing the connection of members 48—49 with fitting 46, and thence pulling said members outwardly. Removal of support 51 to permit the device to be tilted forwardly to rest on tongue 12 and thereby shift the contents of the kettle to the front thereof, permits removal and cleaning of the filter unit while the kettle contains bitumen by virtue of the fact that access to said filter is not limited to the interior of the kettle as in previous constructions.

I claim:

1. In a portable bitumen heater, a bitumen kettle having sides, top and bottom fixedly secured together, a pair of spaced parallel elongated members carried by said top, said top having an opening between said members, a removable imperforate closure for said opening, and a locking bar pivoted to said closure, said members having latches at opposite ends thereof to receive the ends of said locking bar, the upper surfaces of said members being of concave curvature spaced above the level of said opening whereby they are adapted to support a bitumen container above said opening.

2. In a transportable bitumen heater, a bitumen kettle having sides, top and bottom fixedly interconnected, a pair of spaced opposed members carried by said top, said top having an opening between said members defined by an upwardly extending marginal flange, a removable imperforate closure cap covering said opening and fitting around said marginal flange, and a locking bar pivoted to said closure, said members having latches at opposite ends for interlocking engagement with said bar and having complementary concaved upper surfaces above said marginal flange and adapted to support a cylindrical bitumen container above said opening.

3. In a transportable bitumen heating kettle comprising a shiftable support having vertical walls and open at its top, a bitumen container of smaller size than said support and fitting therein in spaced relation to said walls to define a heat chamber, a top fixedly secured to said container and projecting outwardly therefrom and secured to the top of said support, said top having an opening, an imperforate sealing closure for said opening locked on said top, container heating means carried by one end of said support and an open ended member extending through said container and support at the end thereof opposite said heating means and having its inner end within said container upturned and its outer end exteriorly of said frame downturned.

4. A latch member adapted to be mounted on the top of a portable bitumen kettle having an opening adapted to be sealed by a removable closure mounting a pivoted locking bar, comprising a body having a base adapted to be secured to said top and a rigid elongated upright portion, said upright portion being cut away at one end below its upper edge to define a latch recess for receiving said locking bar, the upper edge of said upright portion being of concave curvature to support a bitumen container in predetermined relation to said kettle and its top opening.

5. In a transportable bitumen heating kettle, a portable frame formed of vertical panels and open at its top, a bitumen container comprising top, bottom and sides secured together in substantially sealed relation and spaced from said frame to form a heating chamber, means for securing said container within said frame suspended from the upper edge of said frame, said container top having an opening therein, a removable imperforate closure for sealing said opening, means for locking said closure on said opening, heating means carried by and projecting into said frame, and an open ended vent member extending through the upper end of said container side and adjacent frame panel for venting volatile bitumen constituents from said container, said vent member having a downwardly turned outer end, said container being positioned between said heating means and said vent member.

WILLIAM McKEAN WHITE.